(12) United States Patent
Kodama et al.

(10) Patent No.: US 10,002,418 B2
(45) Date of Patent: Jun. 19, 2018

(54) LASER BEAM WELDING DIAGNOSIS APPARATUS AND LASER BEAM WELDING DIAGNOSIS METHOD

(71) Applicant: JFE STEEL CORPORATION, Tokyo (JP)

(72) Inventors: Toshifumi Kodama, Tokyo (JP); Shigeto Sakashita, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 21 days.

(21) Appl. No.: 14/917,132

(22) PCT Filed: Aug. 29, 2014

(86) PCT No.: PCT/JP2014/072747
§ 371 (c)(1),
(2) Date: Mar. 7, 2016

(87) PCT Pub. No.: WO2015/037457
PCT Pub. Date: Mar. 19, 2015

(65) Prior Publication Data
US 2016/0203596 A1    Jul. 14, 2016

(30) Foreign Application Priority Data
Sep. 12, 2013   (JP) ................................. 2013-189594

(51) Int. Cl.
*G06K 9/00* (2006.01)
*G06T 7/00* (2017.01)
(Continued)

(52) U.S. Cl.
CPC .......... *G06T 7/0008* (2013.01); *B23K 26/032* (2013.01); *B23K 26/262* (2015.10); *B23K 31/125* (2013.01); *G06T 2207/30164* (2013.01)

(58) Field of Classification Search
None
See application file for complete search history.

(56) References Cited

U.S. PATENT DOCUMENTS 4,616,121 A * 10/1986 Clocksin ............. B23K 9/0956
                                                          219/124.34
4,827,099 A    5/1989  Krebs et al.
(Continued)

FOREIGN PATENT DOCUMENTS

CN    102066040 A    5/2011
DE    10338062 A1    4/2005
(Continued)

OTHER PUBLICATIONS

Dorsch, Friedhelm, et al. "NIR-camera-based online diagnostics of laser beam welding processes." High Power Laser Materials Processing: Lasers, Beam Delivery, Diagnostics, and Applications. vol. 8239. International Society for Optics and Photonics, 2012. 12 pages.*

(Continued)

*Primary Examiner* — Ryan P Potts
(74) *Attorney, Agent, or Firm* — Oliff PLC (57) ABSTRACT

A laser beam welding diagnosis apparatus includes: an imaging unit configured to capture images of a laser beam welding penetration side of a laser beam welded portion at a predetermined time interval; a feature amount calculating unit configured to calculate, from an image captured by the imaging unit, a feature amount of a jetted portion accompanying laser beam welding penetration; a welding diagnosis unit configured to determine that a welding defect in the laser beam welded portion has occurred when values of the feature amounts of a predetermined area around the laser beam welded portion on the laser beam welding penetration side become equal to or less than a predetermined value for a predetermined duration or longer; and an output unit (Continued)

configured to output a welding quality state including the occurrence of the welding defect.

12 Claims, 8 Drawing Sheets

(51) Int. Cl.
  *B23K 31/12* (2006.01)
  *B23K 26/03* (2006.01)
  *B23K 26/262* (2014.01)

(56) References Cited

U.S. PATENT DOCUMENTS

| | | | | |
|---|---|---|---|---|
| 5,272,312 | A * | 12/1993 | Jurca | B23K 26/032 219/121.63 |
| 6,937,329 | B2 * | 8/2005 | Esmiller | B23K 1/0056 219/121.63 |
| 8,604,382 | B2 | 12/2013 | Yano et al. | |
| 2002/0158053 | A1* | 10/2002 | Kessler | B23K 26/032 219/121.83 |
| 2004/0133298 | A1* | 7/2004 | Toyserkani | B23K 26/032 700/166 |
| 2006/0017911 | A1* | 1/2006 | Villar | B61K 9/08 356/4.01 |
| 2008/0041827 | A1* | 2/2008 | Li | B23K 11/115 219/109 |
| 2009/0272725 | A1* | 11/2009 | Kawazoe | B23K 26/032 219/121.64 |
| 2009/0302011 | A1* | 12/2009 | Behr | B23K 26/04 219/121.64 |
| 2011/0100965 | A1 | 5/2011 | Yano et al. | |
| 2012/0152916 | A1 | 6/2012 | Oowaki et al. | |

FOREIGN PATENT DOCUMENTS

| | | |
|---|---|---|
| EP | 2322312 A1 | 5/2011 |
| JP | S55-18439 B2 | 5/1980 |
| JP | H08-267241 A | 10/1996 |
| JP | H10-76383 A | 3/1998 |
| JP | H10-85973 | 4/1998 |
| JP | 2000-263266 A | 9/2000 |
| JP | 2001-138082 A | 5/2001 |
| JP | 3579788 B2 | 10/2004 |
| JP | 4179558 B2 | 11/2008 |
| JP | 2009-72788 A | 4/2009 |
| JP | 2010-115680 A | 5/2010 |
| KR | 2011-0020847 A | 3/2011 |
| WO | 1997/04915 A1 | 2/1997 |
| WO | 2009/157570 A1 | 12/2009 |

OTHER PUBLICATIONS

Sep. 26, 2016 Office Action issued in Chinese Patent Application No. 201480049953.5.
Apr. 21, 2017 Search Report issued in European Patent Application No. 14843489.7.
Dec. 2, 2014 International Search Report issued in International Patent Application No. PCT/JP2014/072747.
Jul. 14, 2017 Office Action issued in Korean Application No. 10-2016-7006043.

* cited by examiner

E  Esp

LASER BEAM WELDING DIAGNOSIS APPARATUS AND LASER BEAM WELDING DIAGNOSIS METHOD

FIELD

This invention relates to a laser beam welding diagnosis apparatus and a laser beam welding diagnosis method, which enable diagnosis of a laser beam welding state by detection of whether or not a penetrated welding state is maintained in a laser beam welded portion.

BACKGROUND

A method of manufacturing a steel pipe product welded by continuously supplying a hot rolled steel sheet and causing both edges thereof to butt against each other while forming the hot rolled steel sheet into a cylindrical shape, is one of conventional methods of manufacturing welded steel pipes. As a method of this welding, electric resistance welding (ERW) is often used, but in recent years, laser beam welding of welding by use of a laser beam as a concentrated heat source has started to be used. In particular, in recent years, high performance laser beam welding machines have been developed, which use semiconductor excited laser, fiber laser, and the like having an oscillation wavelength shorter than that of conventional gas laser, such as $CO_2$ laser, and in which reduction in efficiency caused by generation of plasma due to interaction between the laser beam and the metal to be welded that has evaporated upon welding is hard to occur.

When this laser beam welding is applied to a steel pipe, since melting over a thickness direction of a steel material is required, a penetrated welding state is required to be maintained. However, in a continuous forming process of a steel strip, according to conditions of the manufacturing line, heat input conditions, and the like, the butted position thereof tends to fluctuate. Therefore, there is a need to continuously detect an irradiation point of a laser beam in a laser beam welded portion and to accurately control the irradiation point of the laser beam.

In a method of monitoring welding of this laser beam welded portion, for example, as described in Patent Literature 1, the laser beam welded portion is directly monitored by a television camera, and a weld line (seam position) and a molten pool center position are detected. In this method, the laser beam welded portion is illuminated with external illumination, and on the premise of the weld line being dark and the molten pool being bright as a result of observation thereof, a position of one line for each of weld line detection and molten pool detection is determined in a horizontal direction (a direction perpendicular to a travel direction of the welded steel pipe) on a captured image, and a luminance pattern of that horizontal line is binarized, to thereby detect the positions of the weld line and the molten pool.

Further, according to Patent Literature 2, reflected light, which has been emitted from a light onto a welded portion near a laser beam irradiation portion and reflected from a steel sheet, and plasma light are imaged by an imaging device, and from the captured image, a portion having luminance higher than that of the surrounding steel sheet portion is detected as a laser beam irradiation point.

CITATION LIST

Patent Literature

Patent Literature 1: Japanese Examined Patent Publication No. S55-018439

Patent Literature 2: Japanese Laid-open Patent Publication No. 2000-263266

SUMMARY

Technical Problem

However, according to those described in the above cited Patent Literatures 1 and 2, positions of the weld line and molten pool, and the laser beam irradiation point are just detected by obtaining the image on the laser beam irradiation side of the laser beam welded portion. That is, according to those described in Patent Literatures 1 and 2, whether or not a penetrated welding state is maintained in the laser beam welded portion is not detected, and thus the state of the laser beam welding is unable to be diagnosed.

This invention has been made in view of the above, and an object thereof is to provide a laser beam welding diagnosis apparatus and a laser beam welding diagnosis method, which enable diagnosis of a laser beam welding state by detection of whether or not a penetrated welding state is maintained in a laser beam welded portion.

Solution to Problem

To solve the above-described problem and achieve the object, a laser beam welding diagnosis apparatus according to the present invention performs diagnosis of a laser beam welded portion of a welded pipe welded by butting both edges of a steel strip against each other and irradiating a butted portion with a laser beam and includes: an imaging unit configured to continuously capture images of a laser beam welding penetration side of the laser beam welded portion; a feature amount calculating unit configured to calculate, from an image captured by the imaging unit, a feature amount of a jetted portion accompanying laser beam welding penetration; a welding diagnosis unit configured to determine that a welding defect in the laser beam welded portion has occurred when values of the feature amounts in a predetermined area of the images continuously obtained become equal to or less than a predetermined value for a predetermined duration or longer; and an output unit configured to output a welding quality state including the occurrence of the welding defect.

Moreover, in the above-described laser beam welding diagnosis apparatus according to the present invention, the feature amount is an area occupied by the jetted portion in the predetermined area.

Moreover, in the above-described laser beam welding diagnosis apparatus according to the present invention, the imaging unit detects light of a wavelength emitted by the jetted portion.

Moreover, the above-described laser beam welding diagnosis apparatus according to the present invention includes: a light source configured to irradiate the laser beam welding penetration side of the laser beam welded portion with light of a wavelength equal to or greater than 800 nm and equal to or less than 900 nm; and a bandpass filter that is provided in a light receiving unit of the imaging unit and configured to transmit only the light of the wavelength equal to or greater than 800 nm and equal to or less than 900 nm, and the imaging unit continuously captures the images of the laser beam welding penetration side of the laser beam welded portion by receiving the light of the wavelength equal to or greater than 800 nm and equal to or less than 900 nm.

Moreover, a laser beam welding diagnosis method according to the present invention performs diagnosis of a laser beam welded portion of a welded pipe welded by butting both edges of a steel strip against each other and irradiating a butted portion with a laser beam, and includes: an imaging step of continuously capturing images of a laser beam welding penetration side of the laser beam welded portion; a feature amount calculating step of calculating, from an image captured by the imaging step, a feature amount of a jetted portion accompanying laser beam welding penetration; a welding diagnosis step of determining that a welding defect in the laser beam welded portion has occurred when values of the feature amounts in a predetermined area of the images continuously obtained become equal to or less than a predetermined value for a predetermined duration or longer; and an output step of outputting a welding quality state including the occurrence of the welding defect.

Moreover, in the above-described laser beam welding diagnosis method according to the present invention, the feature amount is an area occupied by the jetted portion in the predetermined area.

Moreover, in the above-described laser beam welding diagnosis method according to the present invention, in the imaging step, light of a wavelength emitted by the jetted portion is detected.

Moreover, the above-described laser beam welding diagnosis method according to the present invention includes: a single wavelength light irradiation step of irradiating the laser beam welding penetration side of the laser beam welded portion with light of a wavelength equal to or greater than 800 nm and equal to or less than 900 nm, and in the imaging step, the images of the laser beam welding penetration side of the laser beam welded portion are continuously captured by receiving only the light of the wavelength equal to or greater than 800 nm and equal to or less than 900 nm.

Advantageous Effects of Invention

According to this invention, since the feature amount calculating unit calculates, from the image captured by the imaging unit, the feature amount of the jetted portion accompanying the laser beam welding penetration, and the welding diagnosis unit determines that a welding defect in the laser beam welded portion has occurred if the values of the feature amounts in the predetermined area of the images continuously obtained become equal to or less than the predetermined value for the predetermined duration or longer, the laser beam welding state is able to be diagnosed by detection of whether or not the penetrated welding state is maintained in the laser beam welded portion.

DESCRIPTION OF EMBODIMENTS

Hereinafter, with reference to the appended drawings, modes for carrying out this invention will be described.

(Schematic Configuration of Laser Beam Welding Apparatus)

Figure 1:
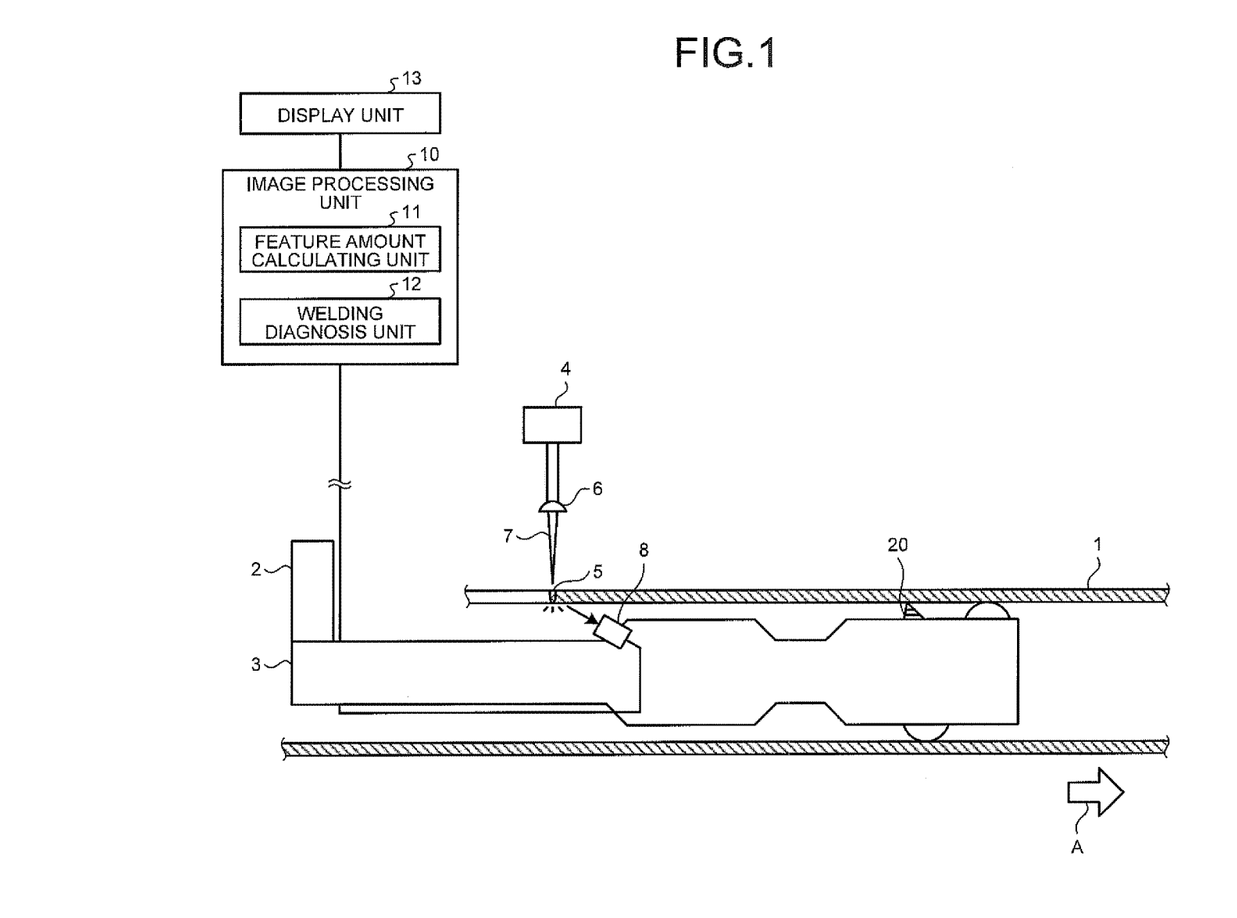
FIG. 1 is a schematic diagram illustrating a schematic configuration of a laser beam welding apparatus including a laser beam welding diagnosis apparatus according to an embodiment of this invention.
Figure 2:
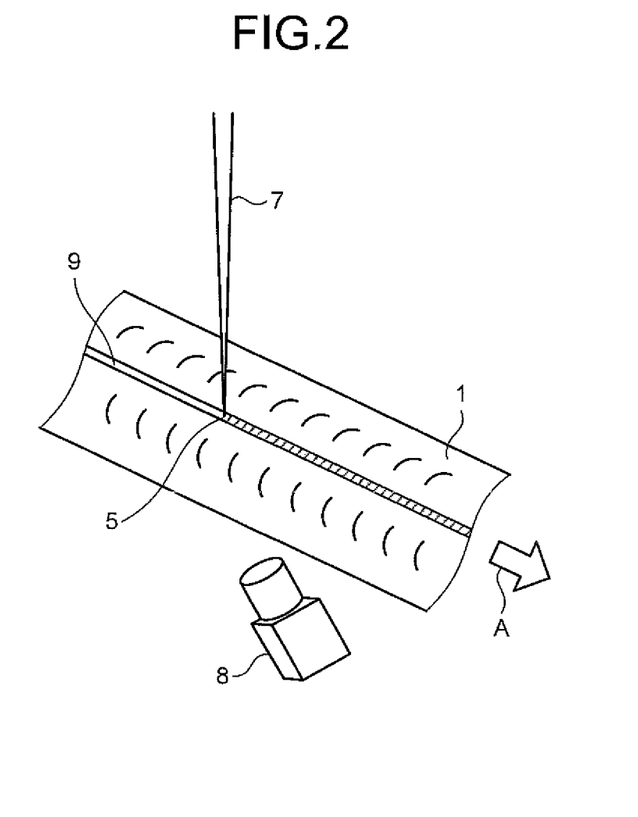
FIG. 2 is a schematic diagram illustrating positional relations of a laser beam and an imaging unit, with respect to a welded pipe.

FIG. 1 is a schematic diagram illustrating a schematic configuration of a laser beam welding apparatus including a laser beam welding diagnosis apparatus according to an embodiment of this invention. Further, FIG. 2 is a schematic diagram illustrating positional relations of a laser beam 7 and an imaging unit 8, with respect to a welded pipe. In FIG. 1, first, a steel strip 1 is formed, at a pipe body travel direction A upstream side, into a cylindrical shape via a concave shape in a width direction by a forming means not illustrated, and as illustrated in FIG. 2, a butted portion 9 is formed by butting both edges of the steel strip 1 against each other. In FIG. 1 and FIG. 2, the laser beam 7 output from a welding laser light source 4 is transmitted via a transmission tube, an optical fiber, or the like, to near a laser beam welded portion 5 of the butted portion 9, and is condensed by an optical system 6 such that energy density is increased at the laser beam welded portion 5. The butted portion 9 is laser beam welded by irradiation of this laser beam welded portion 5 with the laser beam 7, and the steel strip 1 is then conveyed as a welded pipe in a pipe body travel direction A.

A cutting bar 3 is fitted into this welded pipe from an upstream side of the pipe body travel direction A. This cutting bar 3 is supported by a support arm 2 at an upstream side thereof. The cutting bar 3 is provided with a cutting tool 20 downstream from the laser beam welded portion 5. This cutting tool 20 continuously cuts any bulge or the like of molten steel (weld bead) generated when a pressing amount (upset) at the laser beam welded portion 5 is large, from an inner surface of the pipe body along with conveyance of the welded pipe.

(Schematic Configuration of Laser Beam Welding Diagnosis Apparatus)

The laser beam welding diagnosis apparatus has an imaging unit 8, an image processing unit 10, and a display unit 13. The imaging unit 8 uses the above described cutting bar 3 and is arranged on the cutting bar 3. The imaging unit 8 is arranged upstream of the cutting tool 20 and near the laser beam welded portion 5, and continuously captures images of the laser beam welded portion 5 from inside the pipe body (laser beam welding penetration side) during laser beam welding. The images captured are transmitted to the image processing unit 10. The image processing unit 10 has a feature amount calculating unit 11 and a welding diagnosis unit 12. The feature amount calculating unit 11 calculates feature amounts (spatter feature amounts) of a jetted portion (spatter) accompanying laser beam welding penetration from the images. The welding diagnosis unit 12 determines that a welding defect in the laser beam welded portion 5 has occurred, if spatter feature amounts C in a predetermined area E corresponding to the laser beam welded portion 5 on the obtained images become equal to or less than a predetermined value for a predetermined duration or longer. A result of this determination is displayed and output by the display unit and an alarm is output by a buzzer or the like not illustrated.

A commercially available industrial monitoring camera, such as a COD camera or a CMOS camera, may be used as the imaging unit 8. Further, in consideration of a range in which the spatter is generated, the predetermined area E is, for example, a range of the laser beam welded portion 5 and about a 20 mm square around thereof. Furthermore, an imaging frequency of the imaging unit 8 in the continuous imaging may be an imaging frequency of a general video camera (30 frames/second), but may also be an imaging frequency that is a few times higher than that frequency. In brief, it just needs to be set in consideration of a duration of a welding defect, or the like.

(Concept of Laser Beam Welding Diagnosis)

Figure 3:
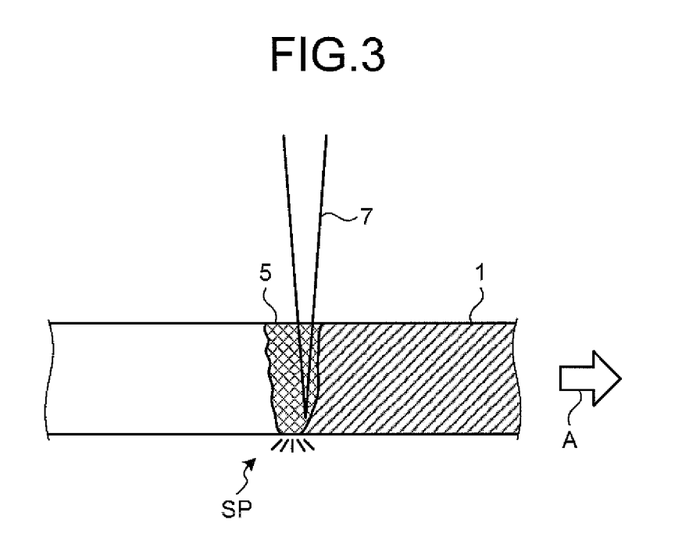
FIG. 3 is a schematic diagram illustrating a cross section of a laser beam welded portion that has been penetration welded.
Figure 4:
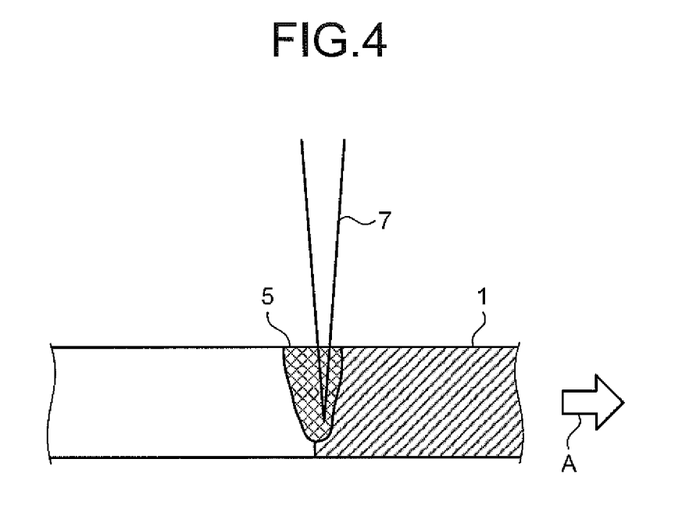
FIG. 4 is a schematic diagram illustrating a cross section of a laser beam welded portion that has not been penetration welded.

FIG. 3 and FIG. 4 each schematically illustrate a cross section of the laser beam welded portion 5. When the laser beam welded portion 5 is irradiated with the laser beam from outside the welded pipe, the steel material is melted by energy of the laser beam, and while forming a keyhole, the laser beam penetrates therethrough. As this happens, a spatter (jetted portion), which is molten steel fiercely jetted out to a laser beam irradiation side of the laser beam welded portion 5, is spattered, but a spatter SP is also radially spattered to a laser beam welding penetration side inside the welded pipe. This spatter SP is generated, as illustrated in FIG. 3, in penetrated welding, and is not generated, as illustrated in FIG. 4, upon a welding defect not resulting in penetrated welding. Therefore, presence of the spatter SP is able to be used as direct evidence that the laser beam welding has resulted in penetrated welding and has gone well.

Figure 5:
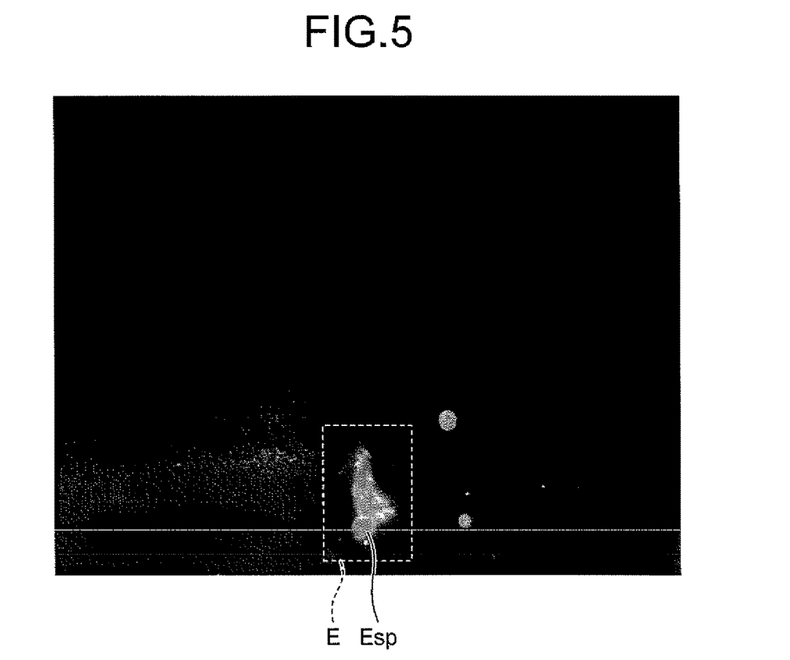
FIG. 5 is a diagram illustrating an example of an image of a laser beam welding penetration side of a laser beam welded portion that has been penetration welded.
Figure 6:
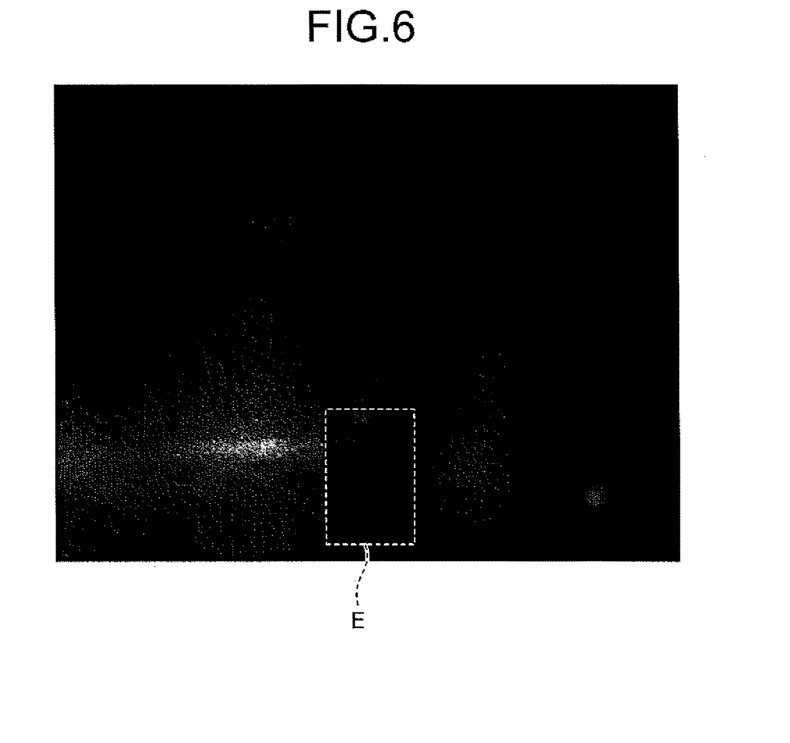
FIG. 6 is a diagram illustrating an example of an image of a laser beam welding penetration side of a laser beam welded portion that has not been penetration welded.

Since the spatter SP is brighter than its surroundings due to its self-emitting light and has a high pixel value in the image, the presence of the spatter SP is able to be detected easily by image capturing. FIG. 5 is an example of an image in a case where a spatter SP has been generated, and a bright image area Esp of the spatter SP is able to be confirmed in the predetermined area E around the laser beam welded portion 5. Further, FIG. 6 is an example of an image in a case where a spatter SP is not generated, and the bright image area Esp of the spatter SP is unable to be confirmed in the predetermined area E. If the positional relation between the laser beam welded portion 5 and the imaging unit 8 is constant, a position at which the spatter SP is generated is substantially constant. If the bright image area Esp of a spatter SP is present in an area outside the predetermined area E, the laser beam is emitted diagonally to an end face of the butted portion 9, the laser beam irradiation point is displaced from the laser beam welded portion 5, or the like. Therefore, any case where the spatter SP is not present in the predetermined area E is able to be determined as a welding defect.

In this determination of the presence of the spatter SP in the predetermined area E, first, an area (number of pixels) of a bright portion in the predetermined area E is calculated as the spatter feature amount C by the feature amount calculating unit 11. The welding diagnosis unit 12 determines that a spatter SP has not been generated and the welding has resulted in failure, if this spatter feature amount C becomes equal to or less than a predetermined value Cth for a predetermined duration or longer. This predetermined duration may be an integer multiple of an imaging interval at which the imaging unit 8 continuously captures the images. For example, when the predetermined duration is twice as long as the time period of the imaging interval, if the spatter feature amounts C are equal to or less than the predetermined value Cth in the predetermined area E of images continuously obtained twice, it is determined that the welding has resulted in failure. This predetermined duration may be a single imaging interval.

Figure 7:
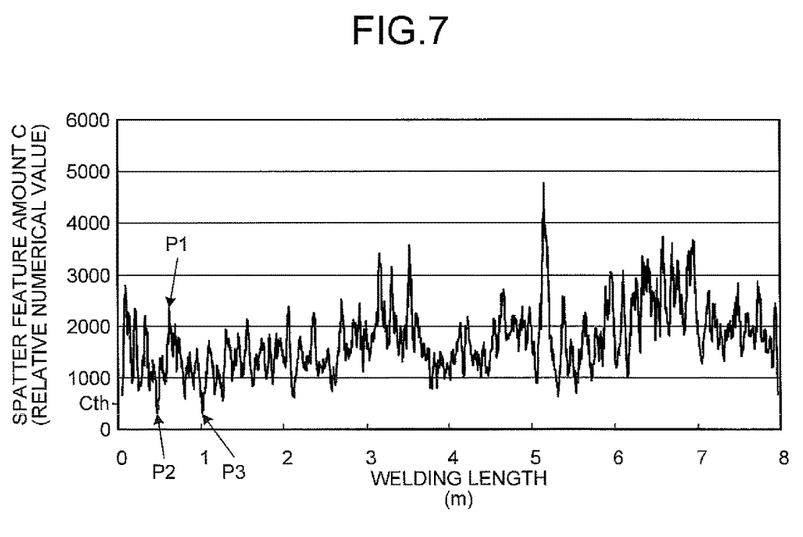
FIG. 7 is a diagram illustrating an example of change in spatter feature amount versus welding length.

FIG. 7 illustrates an example of change in spatter feature amount C versus welding length. The image in FIG. 5 is that of a position P1 on the graph and the image in FIG. 6 is that of a position 22 on the graph. In this case, when the spatter feature amount C is equal to or less than the predetermined value Cth (=500), the welding has resulted in failure without resulting in penetrated welding. Therefore, at a position P3 on the graph when the welding length is 1 m, it is able to be determined that a welding defect has occurred.

(Laser Beam Welding Diagnosis Process)

Figure 8:
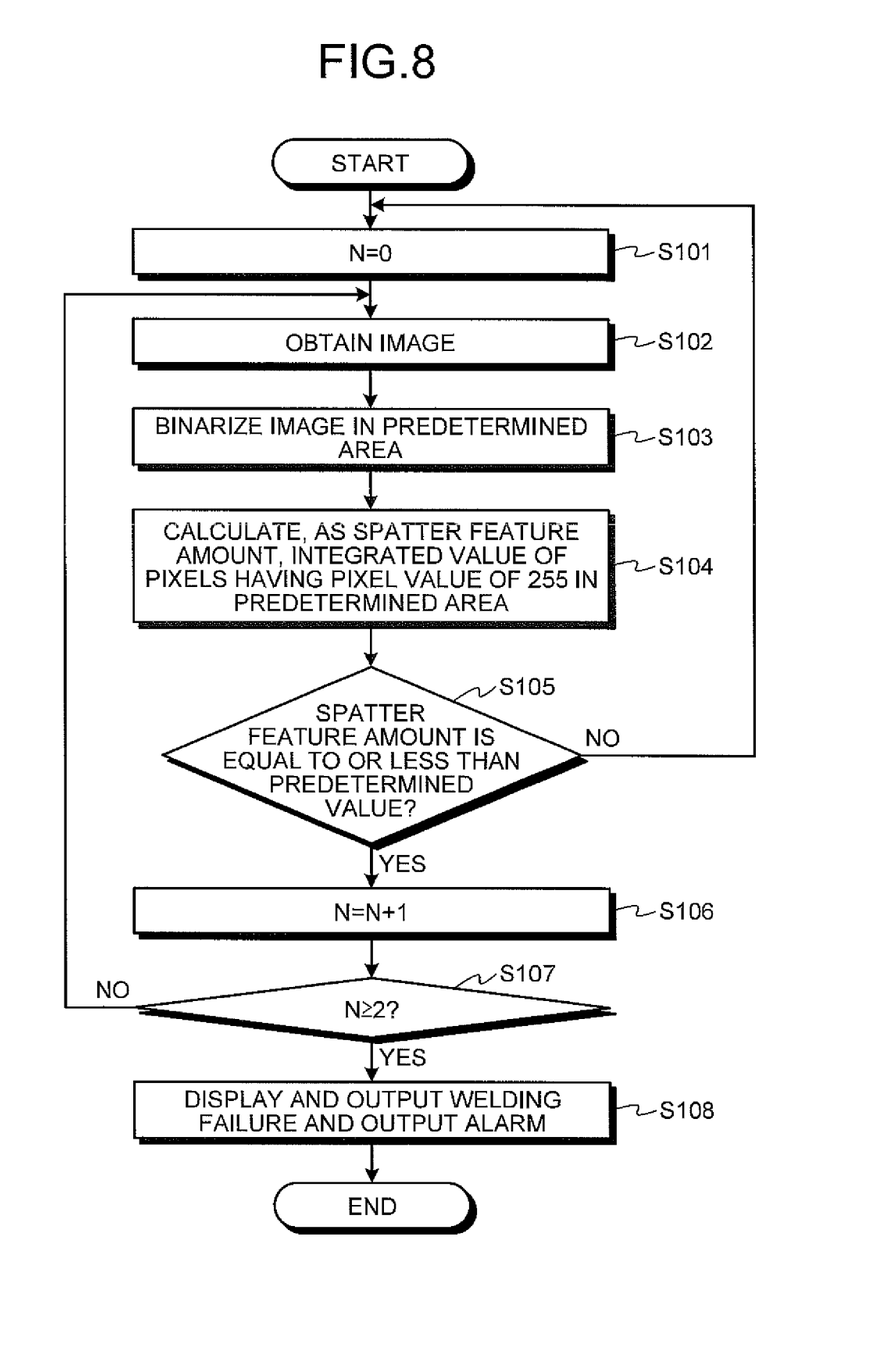
FIG. 8 is a flow chart illustrating a sequence of a laser beam welding diagnosis process by an image processing unit.

With reference to a flow chart illustrated in FIG. 8, a sequence of a laser beam welding diagnosis process will be described. First, the welding diagnosis unit 12 sets a variable N to an initial value, 0 (Step S101). Thereafter, the feature amount calculating unit 11 obtains an image captured by the imaging unit 8 (Step S102). Further, the feature amount calculating unit 11 performs binarization of an image in the predetermined area E in the obtained image (Step S103). By this binarization, when the pixel values are 0 to 255, the pixel values are separated into 0 (dark) and 255 (bright). Thereafter, by use of this binarized image, an integrated value of pixels having the pixel value of 255 in the predetermined area E is calculated as the spatter feature amount C (Step S104).

Thereafter, the welding diagnosis unit 12 determines whether or not the spatter feature amount C is equal to or less than the predetermined value Cth (Step S105). If the spatter feature amount C is not equal to or less than the predetermined value Cth (Step S105: No), the process is advanced to Step S101, and the variable N is set to the initial value, 0. On the contrary, if the spatter feature amount C is equal to or less than the predetermined value Cth (Step S105: Yes), the variable N is incremented (Step S106), and whether of not the variable N is equal to or greater than 2 is determined further (Step S107). If the variable N is not equal to or greater than 2 (Step S107: No), the process is advanced to Step S102. On the contrary, if the variable N is equal to or greater than 2 (Step S107: Yes), it is determined that the welding has resulted in failure, the fact that a welding defect has occurred is displayed and output by the display unit 13, and an alarm is output via an alarm unit, such as a buzzer, not illustrated (Step S108).

In this flow, on the premise of the images being obtained at predetermined intervals, twice of this predetermined interval is set as the predetermined duration. Therefore, it is determined that a welding defect has occurred when the spatter feature amount C becomes equal to or less than the predetermined value Cth twice, consecutively.

(Modification)

In the above described embodiment, self-emitting light of a spatter SP generated on the laser beam welding penetration side of the laser beam welded portion 5 is imaged, but this modification enables a steel sheet surface other than a spatter SP inside a welded pipe to be imaged without being influenced by optical intensity of the spatter SP.

Figure 9:
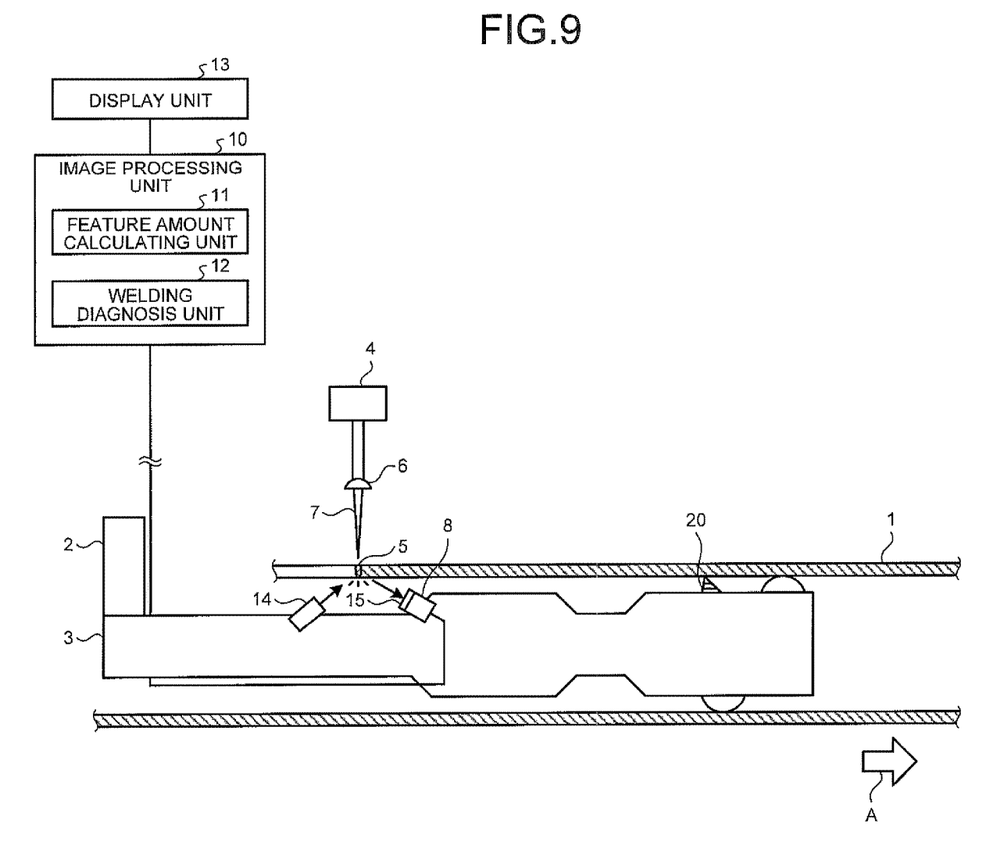
FIG. 9 is a schematic diagram illustrating a schematic configuration of a laser beam welding apparatus including a laser beam welding diagnosis apparatus according to a modification of the embodiment of this invention.

That is, as illustrated in FIG. 9, a light source 14, which irradiates the laser beam welding penetration side of the laser beam welded portion 5 with light of a wavelength equal to or greater than 800 nm and equal to or less than 900 nm, is provided on the cutting bar 3, and a bandpass filter 15, which transmits only light of a wavelength equal to or greater than 800 nm and equal to or less than 900 nm, is provided in an optical receiving unit of the imaging unit 8.

Figure 10:
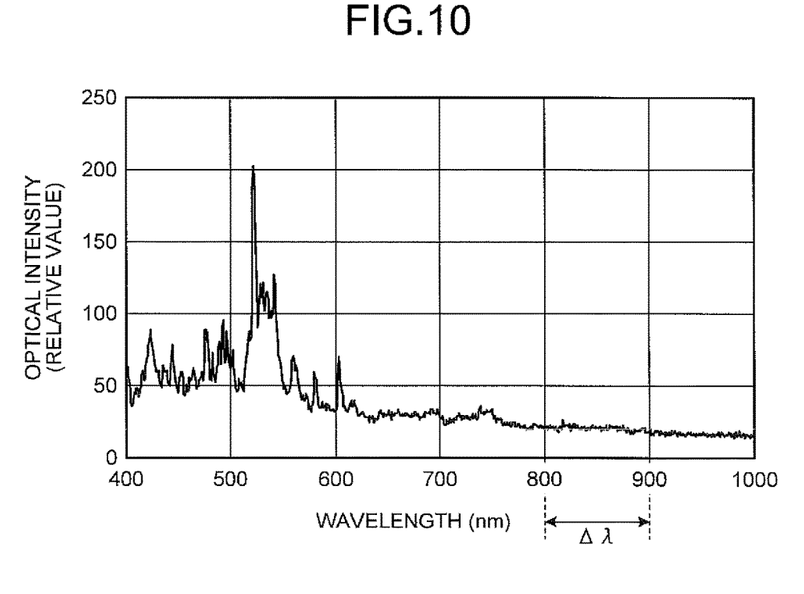
FIG. 10 is a diagram illustrating an emission spectrum of a spatter and a wavelength region of a light source and a bandpass filter illustrated in FIG. 9.

FIG. 10 illustrates a wavelength spectrum of optical intensity emitted by a spatter SP and the spatter SP includes many wavelength components of less than 800 nm. Imaging sensitivity of the imaging unit 8, such as a CCD camera, becomes small in an infrared region exceeding 900 nm. Therefore, by imaging in a wavelength region $\Delta\lambda$ equal to or greater than 800 nm, which is a wavelength region where the spatter optical intensity is small, and equal to or less than 900 nm, where there is imaging sensitivity of the imaging unit 8, an image including both the spatter SP and a steel sheet surface or the like other than the spatter SP is able to be obtained.

The light source 14 may be a single wavelength light source, or may be a white light source and irradiation wavelength thereof may be limited via a bandpass filter. In particular, the light source 14 is preferably a semiconductor laser light source (LD) because the semiconductor laser light source is small sized and is able to output high optical intensity. Further, an interference filter of the film dielectric method may be used as the bandpass filter 15, for example.

According to this embodiment and modification, since whether or not a penetrated welding state of laser beam welding is maintained is detected accurately and in real time, based on presence of a spatter SP generated on the laser beam welding penetration side of the laser beam welded portion 5, restoration in case of a welding defect state of laser beam welding is able to be performed early, and thus the yield of steel pipe manufacture is able to be improved. Further, the quality of the manufactured steel pipes is able to be improved.

REFERENCE SIGNS LIST

1 STEEL STRIP
2 SUPPORT ARM
3 CUTTING BAR
4 WELDING LASER LIGHT SOURCE
5 LASER BEAM WELDED PORTION
6 OPTICAL SYSTEM
7 LASER BEAM
8 IMAGING UNIT
9 BUTTED PORTION
10 IMAGE PROCESSING UNIT
11 FEATURE AMOUNT CALCULATING UNIT
12 WELDING DIAGNOSIS UNIT
13 DISPLAY UNIT
14 LIGHT SOURCE
15 BANDPASS FILTER
20 CUTTING TOOL
A PIPE BODY TRAVEL DIRECTION
C SPATTER FEATURE AMOUNT
Cth PREDETERMINED VALUE
E PREDETERMINED AREA
Esp IMAGE AREA
SP SPATTER
$\Delta\lambda$ WAVELENGTH REGION

The invention claimed is:

1. A laser beam welding diagnosis apparatus that performs diagnosis of a laser beam welded portion of a welded pipe welded by butting both edges of a steel strip against each other and irradiating a butted portion with a laser beam, the laser beam welding diagnosis apparatus comprising:
    a camera configured to capture images of a laser beam welding penetration side of the laser beam welded portion at a predetermined time interval; and
    a processor programmed to function as:
        a feature amount calculating unit configured to calculate, from the images captured by the camera, feature amounts of a jetted portion which is spatter jetted out from a keyhole at the laser beam welding penetration side accompanying laser beam welding penetration, the laser beam welding penetration side being at an inside of the welded pipe;
        a welding diagnosis unit configured to determine that a welding defect in the laser beam welded portion has occurred when values of the feature amounts of a predetermined area around the laser beam welded portion on the laser beam welding penetration side become equal to or less than a predetermined value for a predetermined duration or longer; and
        an output unit configured to output a welding quality state including the occurrence of the welding defect.

2. The laser beam welding diagnosis apparatus according to claim 1, wherein the feature amount is an area occupied by the jetted portion in the predetermined area.

3. The laser beam welding diagnosis apparatus according to claim 2, wherein the camera detects light of a wavelength emitted by the jetted portion.

4. The laser beam welding diagnosis apparatus according to claim 2, comprising:
    a light source configured to irradiate the laser beam welding penetration side of the laser beam welded portion with light of a wavelength equal to or greater than 800 nm and equal to or less than 900 nm; and
    an interference filter that is provided in a light receiving unit of the camera and configured to transmit only the light of the wavelength equal to or greater than 800 nm and equal to or less than 900 nm, wherein
    the camera captures the images of the laser beam welding penetration side of the laser beam welded portion by receiving the light of the wavelength equal to or greater than 800 nm and equal to or less than 900 nm at a predetermined time interval.

5. The laser beam welding diagnosis apparatus according to claim 1, wherein the camera detects light of a wavelength emitted by the jetted portion.

6. The laser beam welding diagnosis apparatus according to claim 1, comprising:
    a light source configured to irradiate the laser beam welding penetration side of the laser beam welded portion with light of a wavelength equal to or greater than 800 nm and equal to or less than 900 nm; and
    an interference filter that is provided in a light receiving unit of the camera and configured to transmit only the light of the wavelength equal to or greater than 800 nm and equal to or less than 900 nm, wherein
    the camera captures the images of the laser beam welding penetration side of the laser beam welded portion by receiving the light of the wavelength equal to or greater than 800 nm and equal to or less than 900 nm at a predetermined time interval.

7. A laser beam welding diagnosis method of performing diagnosis of a laser beam welded portion of a welded pipe welded by butting both edges of a steel strip against each other and irradiating a butted portion with a laser beam, the laser beam welding diagnosis method comprising:
   an imaging step of capturing images of a laser beam welding penetration side of the laser beam welded portion at a predetermined time interval;
   a feature amount calculating step of calculating, from the images captured by the imaging step, feature amounts of a jetted portion which is spatter jetted out from a keyhole at the laser beam welding penetration side accompanying laser beam welding penetration, the laser beam welding penetration side being at an inside of the welded pipe;
   a welding diagnosis step of determining that a welding defect in the laser beam welded portion has occurred when values of the feature amounts of a predetermined area around the laser beam welded portion on the laser beam welding penetration side become equal to or less than a predetermined value for a predetermined duration or longer; and
   an output step of outputting a welding quality state including the occurrence of the welding defect.

8. The laser beam welding diagnosis method according to claim 7, wherein the feature amount is an area occupied by the jetted portion in the predetermined area.

9. The laser beam welding diagnosis method according to claim 8, wherein in the imaging step, light of a wavelength emitted by the jetted portion is detected.

10. The laser beam welding diagnosis method according to claim 8, comprising:
    a single wavelength light irradiation step of irradiating the laser beam welding penetration side of the laser beam welded portion with light of a wavelength equal to or greater than 800 nm and equal to or less than 900 nm, wherein
    in the imaging step, the images of the laser beam welding penetration side of the laser beam welded portion are captured by receiving only the light of the wavelength equal to or greater than 800 nm and equal to or less than 900 nm at a predetermined time interval.

11. The laser beam welding diagnosis method according to claim 7, wherein in the imaging step, light of a wavelength emitted by the jetted portion is detected.

12. The laser beam welding diagnosis method according to claim 7, comprising:
    a single wavelength light irradiation step of irradiating the laser beam welding penetration side of the laser beam welded portion with light of a wavelength equal to or greater than 800 nm and equal to or less than 900 nm, wherein
    in the imaging step, the images of the laser beam welding penetration side of the laser beam welded portion are captured by receiving only the light of the wavelength equal to or greater than 800 nm and equal to or less than 900 nm at a predetermined interval.

* * * * *